Nov. 10, 1970 SUGURU SATO 3,539,850

SEMICONDUCTOR RECTIFIER ASSEMBLY FOR COMBINATION WITH VEHICLE-TYPE GENERATORS

Filed April 14, 1969 4 Sheets-Sheet 1

INVENTOR
Suguru SATO
BY
Flynn & Frishauf
his ATTORNEYS

Nov. 10, 1970 SUGURU SATO 3,539,850

SEMICONDUCTOR RECTIFIER ASSEMBLY FOR COMBINATION WITH VEHICLE-TYPE GENERATORS

Filed April 14, 1969 4 Sheets-Sheet 2

INVENTOR
Suguru SATO

INVENTOR
Suguru SATO

INVENTOR
Suguru SATO

United States Patent Office 3,539,850

Patented Nov. 10, 1970

3,539,850
SEMICONDUCTOR RECTIFIER ASSEMBLY FOR COMBINATION WITH VEHICLE-TYPE GENERATORS

Suguru Sato, Kariya-shi, Aichi-ken, Japan, assignor to Nippon Denso K.K., Kariya-shi, Aichi-ken, Japan, a corporation of Japan Filed Apr. 14, 1969, Ser. No. 816,880
Claims priority, application Japan, Apr. 13, 1968 (utility model), 43/30,150
Int. Cl. H02k *11/00*
U.S. Cl. 310—68 10 Claims

ABSTRACT OF THE DISCLOSURE

A single, essentially circular ring-shaped insulating plate carries a group of fan-shaped sector plates on one side into which semiconductor rectifier elements are set in pairs, with housings of opposite polarity; at the other side of the insulating plate, plate-like connecting elements are secured thereto, the opposite terminals of the semiconductor rectifiers being connected to the plates on the other side through openings in the insulating plate, into which the rectifiers fit. The insulating plate therefore becomes a single, unitary carrier for the entire circuitry as well as the active elements of the rectifier assembly, for ready combination in and assembly to the end bell of a vehicle-type alternator.

The present invention relates to an assembly of a group of semiconductor rectifier elements, to be used for further assembly with alternating current generators, and particularly for use with alternating current generators in vehicular installations.

Automotive-type alternators utilize rectifiers which are assembled with the housing of the alternator to provide direct current output. Such alternators are usually of the three-phase type. It is known to construct rectifier subassemblies for such alternators on cooling plates, or heat-dissipating plates which simultaneously provide for electrical connection of one terminal of the rectifier, the rectifier having a conductive housing. Such metallic cooling plates are then assembled to an insulating plate or carrier, either by stand-offs, by screws, rivets or the like; or to assemble these plates directly to the housing of the generator by insulating holding arrangements, such as screws. It has also been proposed to arrange rectifier systems on a pair of metal connecting and cooling plates, each one carrying three rectifiers associated with the three respective phases of a three-phase generator, the cooling and carrier plates being located in opposed relation so that the end faces of the housings of the rectifiers themselves, and their terminals, are located in mutually supporting relation, the entire assembly being secured to an end bell of the generator. Such prior art rectifier assemblies require a comparatively large number of separate parts and steps in their innerconnection so that the construction of the entire rectified array, and its assembly with the generator incurs high labor costs.

It is an object of the present invention to provide a semiconductor rectifier sub-assembly which can be assembled with the housing or end bell of a generator with minimum steps and having a minimum number of independent parts.

SUBJECT MATTER OF THE PRESENT INVENTION

Briefly, an insulated carrier plate is provided to which fan-shaped support plates are attached on one side, into which semiconductor diodes of oppositely poled housings are set. The other terminals of the semiconductor diodes, acting as power rectifiers (and, being thus also of opposite polarity) are connected to connection plates secured to the other side of the insulating plate, separately, the connection plates providing the positive and negative output buses for the rectified current. Thus, for a three-phase generator, three sector-shaped plates will be provided, each holding a pair of semiconductor diodes, and the other side of the insulating plate will have two connection plates secured thereto, one each of the positive and negative output. A third connection plate may be provided, to connect to the center terminal if the alternator armature windings are star-connected. The entire rectifier assembly will thus be carried by the insulated plate, which can be secured to the end bell of the generator housing by a few screws, for example three. If the carrier plate is horse shoe-shaped, it can partly surround the shaft of the generator and its ends can be secured adjacent the customary brush holders to supply current to the field of the alternator, thus providing for a very simple and reliable interconnection. A third screw may connect in the bent portion to the end bell of the housing to provide both for mechanical and electrical attachment of the insulating plate and one of the connecting plates.

The invention will be described by way of example with reference to the accompanying drawings, wherein.

Figure 1:
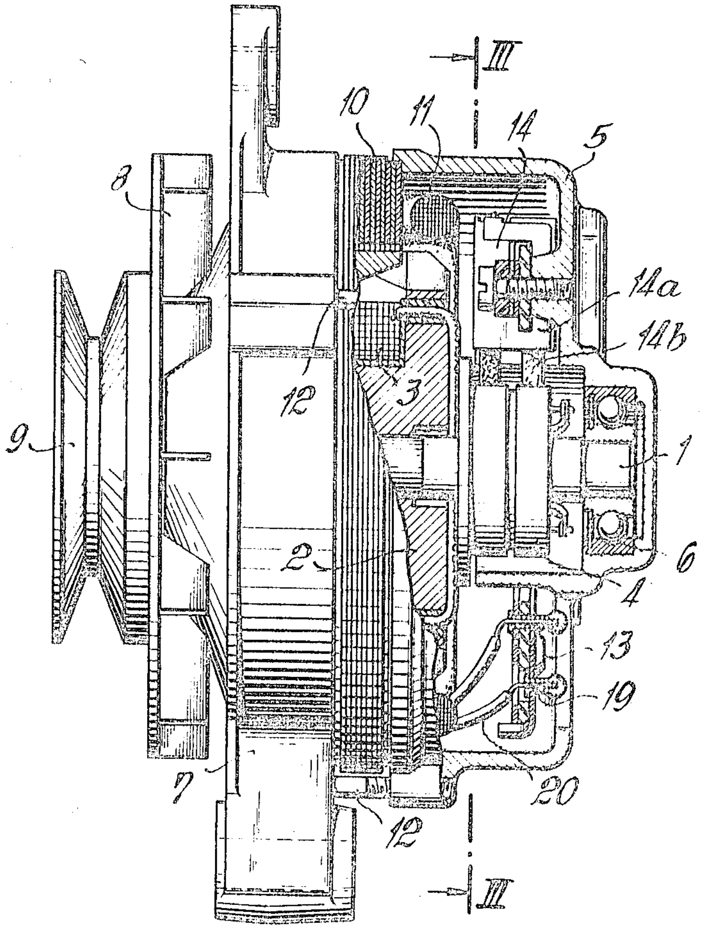
FIG. 1 is a partial, longitudinally sectional view of an alternator.

Referring now to FIG. 1: A shaft 1 carries a salient pole field 2, wound with a field winding 3 which is connected to slip rings 4 to have field current supplied thereto. End bell 5 has a ball bearing 6 set therein. The field structure 1, 2, 3, 4 is further rotatably retained in a bearing (not shown) set into the other end bell 7; at the outside of the generator, the shaft is provided with a pulley 9 and a ventilator fan, schematically illustrated at 8, as well known.

Figure 8:
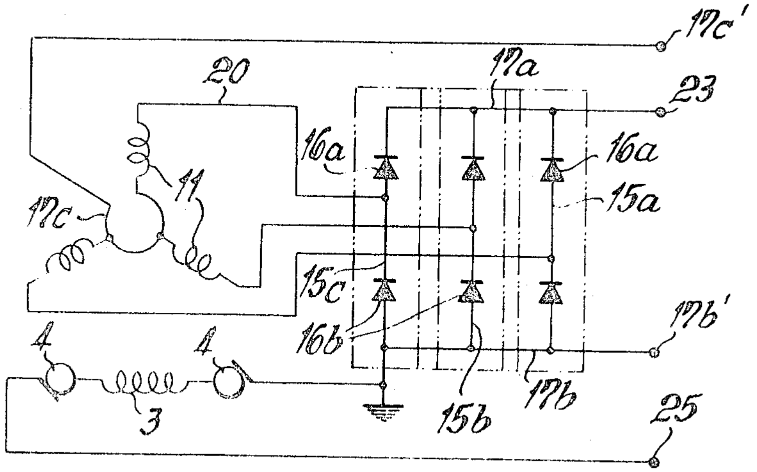
FIG. 8 is a schematic circuit diagram of the rectifying system connected to the generator.

Armature 10 is wound with a three-phase winding 11, star-connected (FIG. 8). The core 10 is set between end bells 5 and 7 and secured in position by screws 12. The three-phase winding 11 is connected over terminal wires 20 to the rectifier sub-assembly 13. The rectifier sub-assembly provides full wave rectification of the output from the armature windings. Slip rings 4 are supplied with currents by means of brushes **14*b*, retained in a brushes holder 14*a* and forming, in general, part of the field supply structure 14**.

Figure 2:
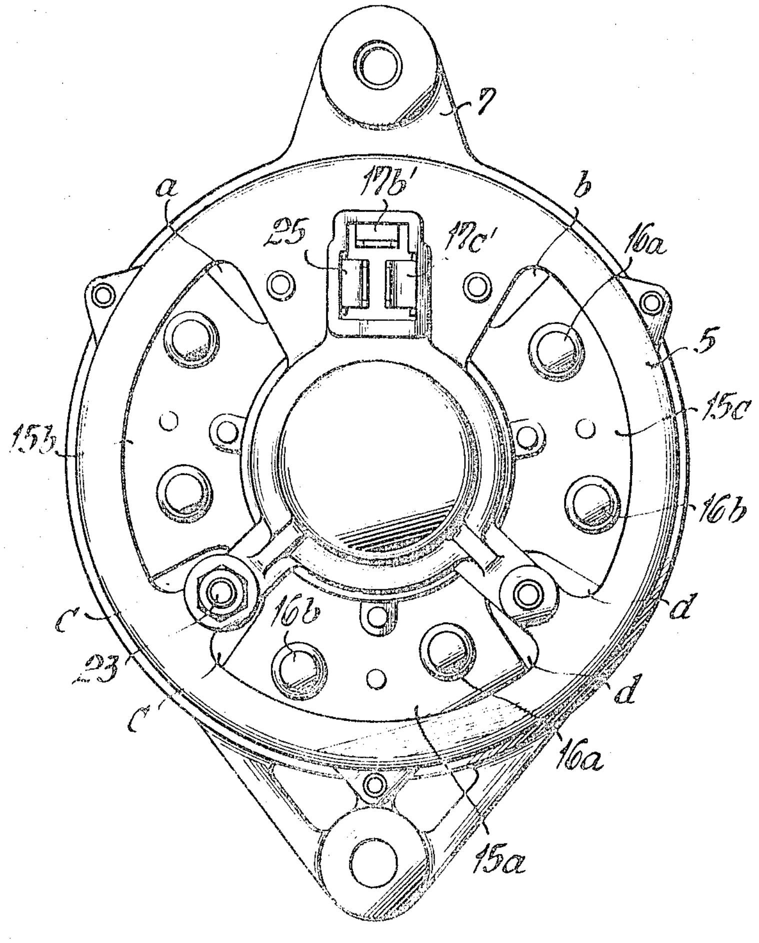
FIG. 2 is an end view of the alternator.
Figure 3:
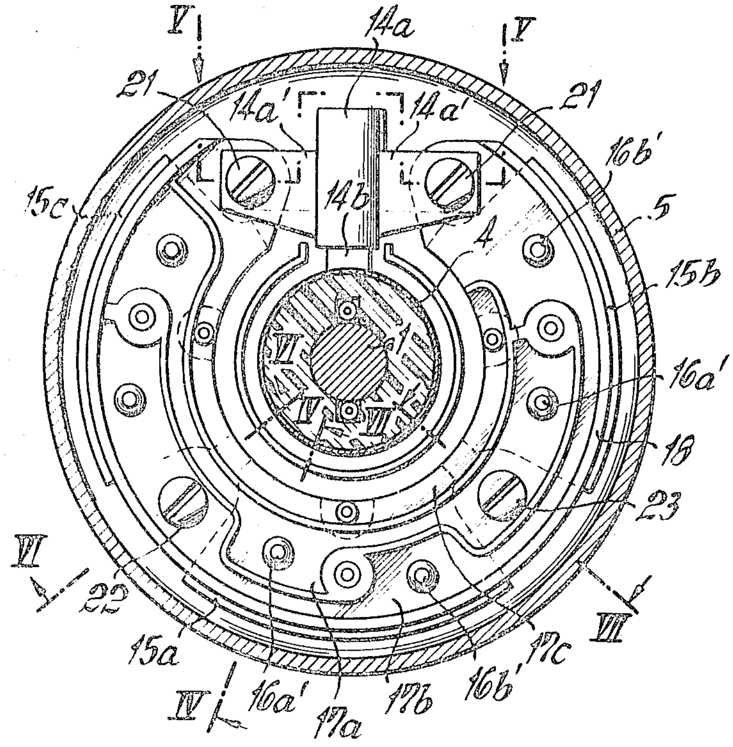
FIG. 3 is a cross-sectional view along lines III—III of FIG. 1.
Figure 4:
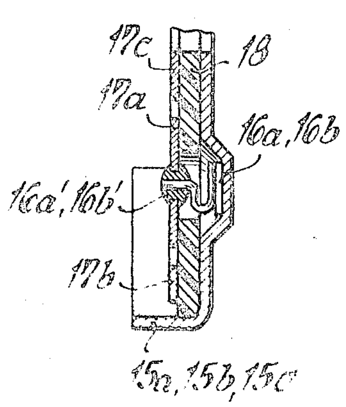
FIG. 4 is a cross-sectional view along lines IV—IV of FIG. 3.

The rectifier assembly which, when combined with the generator forms a sub-assembly for the electrical generating supply of the vehicle, is best seen in FIG. 2 and 3. A generally horse shoe-shaped insulating plate 18 has three sector-shaped metal plates **15*a*, 15*b*, 15*c* applied thereto at one side thereof, for example the right side with respect to FIG. 1. These sector-shaped plates, forming both connecting and cooling elements, are each formed with a pair of openings, into which diode elements of diode pairs 16*a* and 16*b* are set in. The diode 16*a* has an outside housing of positive polarity, whereas diode 16*b* of the pair has an outside housing of negative polarity. If desired, and if the dimensions of the diode elements themselves require it, the sector, or fan-shaped cooling and connecting plates 15$a$, 15$b$, 15$c$ may be bulged outwardly, as best seen in FIG. 4, to permit the diode elements and the associated lead wires 16$a'$, or 16$b'$ (and referring to 16$b$) to be accommodated. The insulating plate 18, itself, is formed with an opening in the region of the location of the diodes 16$a$, 16$b$ and the diodes themselves may partly extend thereinto. The lead wire 16$a'$ (and 16**$b'$, respectively) likewise stand, or are retained in this opening.

Connecting plates 17$a$ and 17$b$ which extend at least partly around the circumference of the horse shoe-shaped plate 18 are located at the opposite side of the insulating plate 18, that is to the left side with respect to FIG. 1 (not seen in FIG. 2). Connecting plates 17$a$, 17$b$ form the electrical connection for similarly poled output terminals of the rectifier elements 16$a$, 16$b$; thus, connecting plate 17$a$ is connected to the terminal wire 16$b'$, to form a positive bus for the output of the rectifier; connecting plate 17$b$ is connected to the lead 16$a'$ to form a negative connecting bus. An additional, third connecting plates 17$c$ is provided at the side of the connecting plate 17$a$, 17$b$ and attached to insulator 18, and connected to the center connection of the star-connected armature windings 11 of the generator (see FIG. 8). The various connecting plates 15$a$, 15$b$, 15$c$ and 17$a$, 17$b$, 17$c$ are secured to the insulating plate in any suitable manner, for example by extending lugs, eyelets, or the like (not shown). The three connecting and cooling plates 15$a$, 15$b$, 15$c$ are formed with eyelets passing through holes in plate 18, to which terminal wires 20 from the generator armature windings 11 are soldered (see FIG. 1). Thus, each one of the cooling and connecting plates 15$a$, 15$b$, 15$c$ forms one output bus of a phase, each, for the three-phase supply obtained for generator windings 11. The auxiliary connecting plates 17$a$, 17$b$, at the other side of the insulating plate 18 then form the positive and negative output buses for the rectified direct current. Bus 17$b$ ends in a terminal point 17$b'$ (FIGS. 2 and 5), terminal 17$b'$ being additionally so located that it can be readily connected to one of the brushes 14$b$ in brush holder assembly 14 to connect with slip ring 4 of the field. Likewise, a terminal point 17$c'$ is provided for electrical connection to bus 17$c$ and thus to the center, star-connection of the armature windings 11.

Figure 5:
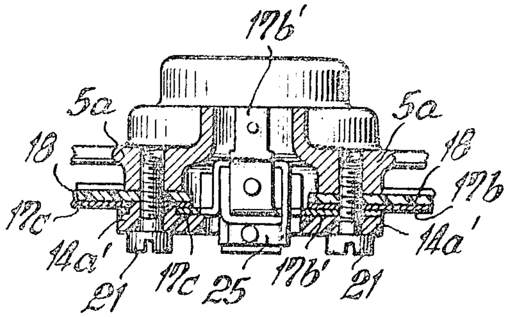
FIG. 5 is a cross-sectional view along lines V—V of FIG. 3.
Figure 6:
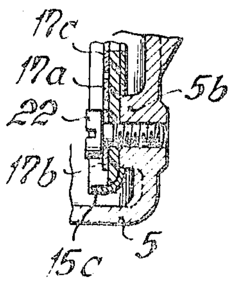
FIG. 6 is a cross-sectional view along lines VI—VI of FIG. 3.
Figure 7:
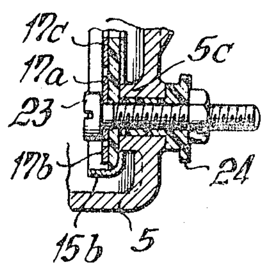
FIG. 7 is a cross-sectional view along lines VII—VII of FIG. 3.

FIGS. 5, 6 and 7 illustrate the connection of insulating plate, and its associated connecting and cooling plates to the generator. FIG. 5, particularly, shows that the terminal ends of the horse shoe-shaped plate 18, which partly surrounds the shaft, and the slip rings of the generator, are connected to arms 14$a'$ of the brush holder assembly 14 by means of screws 21 and then, further, into bosses 5$a$ projecting from the inside of end bell 5 of the generator. Thus, insulating plate 18, together with arms 14$a'$ of the brush holder assembly are secured to the end bell 5. Additionally, auxiliary connecting plate 17$c$ (electrically connected to the center connection of the star-connected armature winding 11) and its associated terminal 17$c'$, as well as connecting plate 17$b$ which forms the negative bus of the rectifier assembly, and its terminal ends 17$b'$ are secured by screws 21 to the end bell 5 and thus to the chassis of the vehicle. The sector-shaped main cooling and connecting plates 15$b$, 15$c$ adjacent screws 21 are so shaped that they are separated from, and do not touch the screws 21; reliefs $a$ and $b$ (FIG. 2) prevent contact.

Insulating plate 18, together with connecting plate 17$b$ is connected additionally to a boss 5$b$ on end bell 5 by means of a screw 22 (FIG. 6). Screw 22 is pulled tight so that connecting plate 17$b$ forms a good electrical connection with screw 22 and electrically interconnects the connecting plate 17$b$ with bell 5 to place connecting plate 17$b$ at chassis potential, while mechanically providing for a third attachment point. Insulating plate 18 is thus connected securely to end bell 5 at three points by means of screws 21 (FIGS. 3 and 5) and screw 22 (FIGS. 3 and 6), and the entire rectifier sub-assembly, including all of its interconnecting plates which, simultaneouly, form additional cooling radiating elements is secured to the generator by merely three screw connections without further, additional interconnections being required. As best seen in FIG. 2, the sector-shaped cooling and connecting plates 15$a$, 15$b$ and 15$c$ additionally are formed with reliefs $c$, $d$, so that the connecting and cooling plates 15$a$, 15$b$, 15$c$ do not touch bosses 5, 5$b$, nor an additional boss 5$c$ (FIGS. 2 and 7) formed on the end bell 5. A terminal 25 (FIGS. 5, 8) is formed on the brush holder assembly 14 to provide the other connection to the field winding 3. FIG. 7 illustrates the connection to positive terminal 23 of the rectifier sub-assembly; connecting plate 17$a$ is in contact with the head of connecting screw 23, leading by means of an insulated bushing 24 through the boss 5$c$ of end bell 5 to provide an externally accessible contact and terminal for the positive output of the generator. Terminal 23 is also shown electrically connected to connection plate, or bus 17$a$ in the circuit diagram of FIG. 8. FIG. 8 also illustrates, in schematic form within the chain-dotted lines the sector-shaped cooling and connecting plates 15$a$, 15$b$, 15$c$ together with the rectifier elements secured thereto, the connections to the windings 11 of the generator, and the central connection by means of connecting plate 17$c$ which connects with a terminal end 17$c'$.

The present invention provides a single carrier and support plate, formed by insulated plate 18, which can be assembled to the end bell as a single item, and thus has substantial advantages in the actual assembly operations over generator-rectifier combinations in which the cooling plates for the rectifiers have to be separately connected to the generator housing by means of insulated bushings, discs, or the like and in which separate mounting, for example by stand-off insulators of the various elements is required. The rectifier sub-assembly of the present invention can be carried as a single unit in the end bell, the insulating plate 18 being directly secured thereto. The number of required separate components is thus substantially reduced and only a minimum number of assembly steps is necessary, either during manufacture or during maintenance or to replace the rectified assembly in an otherwise operative generator. The sector-shaped connecting and cooling plates 15$a$, 15$b$, 15$c$ are not affected by tightening of the attachment screws 21, 22, or 23, since they are not directly connected thereto and thus are not mechanically loaded or distorted, and subject to forces which could be transferred to the much more delicate rectifier elements secured therein. Tightening of the attachment screws against the connection plates 17$a$, 17$b$, or 17$c$ does not put a mechanical stress, or a deformation stress on the rectifier elements since the rectifier terminal wires 16$a'$, 16$b'$ have a certain amount of flexibility. These wires, themselves, are connected to the attachment plates by means of solder plugs as well known and schematically illustrated in FIG. 4. The present invention thus provides an extremely reliable and sturdy semiconductor rectifier sub-assembly suitable for use where it is subject to shock and vibration.

The present invention has been illustrated and described in connection with a three-phase automotive-type alternator, but is not intended to be limited to the details shown and various changes and modifications, to adapt the construction to various uses, may be made within the inventive concept.

What is claimed is:

1. Semiconductor rectifier sub-assembly for assembly with vehicle-type A-C generators having an end bell comprising a plurality of pairs of semiconductive rectifier elements (16$a$, 16$b$) located in oppositely poled housings;

a plurality of plate-like elements (15$a$, 15$b$, 15$c$), each plate-like element having the housings of a pair of said semiconductor rectifier elements attached thereto, to form an electrical phase connection for said rectifier elements as well as a mounting element and cooling radiator for the rectifier elements secured thereto;

an insulating carrier plate (18);

said plate-like mounting elements being secured to one side of said insulating carrier plate (18) adjacent, but separated from each other, said insulating carrier plate (18) being formed with openings beneath rectifier elements (16*a*, 16*b*) on the plate-like elements, said rectifier elements extending at least partly into said openings;

a plurality of connecting plates (17*a*, 17*b*, 17*c*) secured to the other side of said insulating plate (18) and having the other terminals of said rectifier elements connected thereto;

said insulating carrier plate (18) being formed with openings for connection to the end bell of the generator.

2. Rectifier sub-assembly according to claim 1, wherein said insulating plate (18) is horse-shoe shaped and has a central opening surrounding the shaft of the generator;

and the plate-like elements (15*a*, 15*b*, 15*c*) are circular sectors secured, in spaced relation from each other, to the insulating plate (18) at said side thereof.

3. Rectifier sub-assembly according to claim 1, for combination with a three-phase generator wherein three plate-like elements (15*a*, 15*b*, 15*c*) are provided, one each being connected to a phase winding of the generator and securing a pair of rectifier elements (16*a*, 16*b*), and electrically connected to the anode of one rectifier element of the pair and the cathode of the other rectifier element of the pair.

4. Rectifier sub-assembly according to claim 3, wherein the generator is star-connected and wherein one of the connecting plates (17*c*) secured to the insulating plate and located opposite said plate-like elements (15*a*, 15*b*, 15*c*) is connected to the center connection of the star-connected windings of the alternator.

5. Rectifier sub-assembly according to claim 1, wherein at least two connecting plates (17*a*, 17*b*) are secured to the insulating plate (18) and located opposite said plate-like elements (15*a*, 15*b*, 15*c*), one of said connecting plates (17*a*) being connected to the cathodes of the rectifier elements having a positively poled housing (16*a*) and the other connecting plate (17*b*) being connected to the anodes of the rectifier elements having the negatively poled housing (16*b*).

6. Rectifier sub-assembly according to claim 5, wherein the generator is star-connected and an additional connecting plate (17*c*) is provided secured to the insulating plate and located opposite said plate-like elements and connected to the center connection of the star-connected winding of the alternator.

7. Rectifier sub-assembly according to claim 1, including screw connections interconnecting at least one of said connecting plates (17*b*) to the end bell of the generator to both mechanically and electrically secure said connecting plates and said insulating plate to the generator;

and an insulated terminal screw (23) connected through stid insulating plate to another of said connecting plates and mechanically to said generator and forming a terminal for the output of said rectifiers.

8. Semiconductor rectifier sub-assembly for combination with vehicle-type alternators having an end bell comprising an insulated carrier plate (18) having a substantially circular portion surrounding the shaft of said alternator;

attachment openings formed in said carrier plate adapted to pass attachment means and terminal means to attach said plate to said end bell and to connect terminals thereto, respectively, and further formed with connection openings to receive electrical connecting means therethrough;

a plurality (15*a*, 15*b*, 15*c*) of sector-shaped plate elements separated and insulated from each other, and secured to one side of said insulating carrier plate (18), said sector-shaped elements being formed with a pair of openings, each, said connection openings in said insulating plate matching the location of said paired openings of said sector-shaped plate elements;

a rectifier system including rectifier elements (16*a*, 16*b*), said rectifier elements being arranged in pairs having housings of opposite polarity, one pair each having its housing set into said openings in said sector-shaped plate elements (15*a*, 15*b*, 15*c*) and extending into the connection openings of said carrier plate (18);

at least two connecting plates (17*a*, 17*b*) secured to said insulating plate (18) at the other side thereof with respect to said sector-shaped plate elements (15*a*, 15*b*, 15*c*), said connecting plates extending over said matching connection openings and having a terminal of like polarity of said rectifier elements (16*a*, 16*b*) connected thereto;

and terminal points (23) on said sector-shaped plates (15*a*, 15*b*, 15*c*) and said connecting plates (17*a*, 17*b*) to connect said plates to the windings of the generator and the rectified output from said generator, respectively.

9. Semiconductor rectifier sub-assembly according to claim 8, wherein said insulating plate (18) is essentially horse-shoe shaped and said attachment openings are formed at the terminal ends of the horseshoe and intermediate thereof in the circular portion to provide at least a three-point attachment of the insulating plate with said sector-shaped plates and said connecting plates thereon to the generator.

10. Semiconductor rectifier sub-assembly according to claim 9, for combination with a three-phase alternator, wherein three sector-shaped plate elements are provided, one each retaining a pair of rectifier elements;

and said two connecting plates, secured to the other side of said insulating plate have openings matching the attachment openings in said insulating plate whereby said insulating plate and said connecting plate may be mechanically secured to said generator.

References Cited

UNITED STATES PATENTS

| | | | |
|---|---|---|---|
| 3,146,362 | 8/1964 | Bates et al. | 310—68 |
| 3,250,928 | 5/1966 | Bates | 310—68 |
| 3,250,929 | 5/1966 | Maier | 310—68 |
| 3,271,601 | 9/1966 | Raver | 310—68 |
| 3,295,046 | 12/1966 | Margaira | 310—68 X |
| 3,339,096 | 8/1967 | Heinz | 310—68 |
| 3,361,915 | 1/1968 | Baker | 310—68 |

FOREIGN PATENTS

| | | |
|---|---|---|
| 632,087 | 6/1961 | Italy. |
| 1,088,375 | 10/1967 | Great Britain. |

MILTON O. HIRSHFIELD, Primary Examiner

M. O. BUDD, Assistant Examiner

U.S. Cl. X.R.

310—71